(12) United States Patent
Awakura

(10) Patent No.: US 8,266,399 B2
(45) Date of Patent: Sep. 11, 2012

(54) STORAGE SYSTEM, DATA PROTECTION METHOD AND MANAGEMENT COMPUTER, INCLUDING ARRANGEMENT FOR DATA REPLICATION BETWEEN STORAGE DEVICES

(75) Inventor: Minori Awakura, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 807 days.

(21) Appl. No.: 12/263,565

(22) Filed: Nov. 3, 2008

(65) Prior Publication Data
US 2010/0042793 A1 Feb. 18, 2010

(30) Foreign Application Priority Data

Aug. 15, 2008 (JP) ................................. 2008-209183

(51) Int. Cl.
G06F 12/14 (2006.01)
(52) U.S. Cl. ................. 711/162; 711/163; 711/E12.091
(58) Field of Classification Search .................... 711/162
See application file for complete search history.

(56) References Cited

U.S. PATENT DOCUMENTS

| | | | |
|---|---|---|---|
| 2001/0020254 A1* | 9/2001 | Blumenau et al. ............ | 709/229 |
| 2005/0097271 A1* | 5/2005 | Davies et al. ................. | 711/114 |
| 2006/0080516 A1* | 4/2006 | Paveza et al. ................. | 711/162 |
| 2007/0192375 A1 | 8/2007 | Nakatani et al. | |

FOREIGN PATENT DOCUMENTS

JP 2007-219693 8/2007

* cited by examiner

*Primary Examiner* — Matthew Bradley
*Assistant Examiner* — Eric Loonan
(74) *Attorney, Agent, or Firm* — Antonelli, Terry, Stout & Kraus, LLP.

(57) ABSTRACT

The configuration of a copy pair is prevented in which data replication is conducted from a secondary system to a primary system and data is protected. A first storage device manages first information including a first measurement result related to a command received from a first host, and a second storage device manages second information including a second measurement result related to a command received from a second host. When a management computer makes an instruction to configure data replication from a first volume to a second volume, a storage system determines whether data replication from the first volume to the second volume or data replication from the second volume to the first volume is replication from the primary system to the secondary system based on the managed first information and second information, and the determined result is displayed on the management computer.

5 Claims, 10 Drawing Sheets

| # | MEASURED ITEM | MEASURED VALUE |
|---|---|---|
| 1 | TOTAL COUNT OF READS/WRITES | 8,000,000,000 TIMES |
| 2 | TOTAL CAPACITY OF READS/WRITES | 3,023,344,422 SECTORS |
| 3 | LATEST n COUNTS OF READS/WRITES | 5,000 TIMES |
| 4 | LATEST n WRITES OF MAXIMUM WRITE MB/s | 40 MB/s |
| 5 | TOTAL COUNT OF RESERVES | 20,000,000 TIMES |
| 6 | FIRST OPERATING TIME OF A STORAGE DEVICE | 12317283 (utime) ALSO SECONDS, MINUTES, HOURS, DATES, MONTHS AND YEARS |
| 7 | CONNECTING LOGICAL UNIT PATH NUMBER | 4 PATHS |
| 8 | CONNECTING LOGICAL UNIT PATH FINAL CREATION TIME | 2008/2/14, 18:31:12 |
| 9 | NUMBERS OF P-VOLS/S-VOLS OF THE OTHER TC PAIRS | 10 P-VOLS |
| 10 | NUMBER OF UNUSED SECTORS IN A LOGICAL UNIT | 20,000 SECTORS |

| STORAGE DEVICE IDENTIFIER 810 | LU NUMBER 820 | PRIMARY/ SECONDARY 830 | STORAGE DEVICE IDENTIFIER INCLUDING A PAIR LU 840 | PAIR LU NUMBER 850 | PRIMARY/ SECONDARY 860 |
|---|---|---|---|---|---|
| S01 | 001 | PRIMARY | S11 | 001 | SECONDARY |
| S01 | 002 | PRIMARY | S12 | 002 | SECONDARY |
| S01 | 003 | – | UNDEFINED | UNDEFINED | – |
| S01 | 004 | – | UNDEFINED | UNDEFINED | – |
| ... | | | | | |

| # | ITEM FIELD | CONDITION FIELD | DEFINITION FIELD | DETERMINATION LOGIC |
|---|---|---|---|---|
| | 910 | 920 | 930 | 940 | 950 |
| 1 | TOTAL COUNT OF READS/ WRITES | WHEN THE HOST ISSUES A READ OR WRITE COMMAND, MP INCREMENTS THE VALUE KEPT IN THE TABLE | THE COUNT THAT THE HOST GENERATES A READ OR WRITE COMMAND TO THE RELEVANT LU | DETERMINE THAT ONE HAVING A LARGER KEPT VALUE IS THE PRIMARY SYSTEM |
| 2 | TOTAL CAPACITY OF READS/ WRITES | WHEN THE HOST ISSUES A READ OR WRITE TO THE RELEVANT LU, MP ADDS THE COUNT TO THE VALUE KEPT IN THE TABLE | THE TOTAL STORAGE CAPACITY OF READS OR WRITES ISSUED TO THE RELEVANT LU | DETERMINE THAT ONE HAVING A LARGER KEPT VALUE IS THE PRIMARY SYSTEM |
| 3 | LATEST n COUNTS OF READS/WRITES | MP WRITES THE COUNTS OF READS OR WRITES ISSUED TO THE LOGICAL UNIT BY THE HOST DURING THE LATEST n COUNTS TO THE TABLE | THE COUNTS THAT THE HOST GENERATES A READ OR WRITE COMMAND TO THE RELEVANT LU DURING THE LATEST n COUNTS | DETERMINE THAT ONE HAVING A LARGER KEPT VALUE IS THE PRIMARY SYSTEM |
| 4 | LATEST n WRITES OF THE MAXIMUM WRITE MB/s | THE MAXIMUM MB/s OF WRITES ISSUED TO THE RELEVANT LOGICAL UNIT BY THE HOST DURING THE LATEST n WRITES IS KEPT, AND WHEN THE MAXIMUM VALUE IS UPDATED, MP UPDATES THE VALUE KEPT IN THE TABLE | THE MAXIMUM VALUE OF WRITE THROUGHPUT FROM THE HOST TO THE LOGICAL UNIT DURING THE LATEST n WRITES | DETERMINE THAT ONE HAVING A LARGER KEPT VALUE IS THE PRIMARY SYSTEM |
| 5 | TOTAL COUNT OF RESERVES | WHEN THE HOST ISSUES A RESERVE COMMAND OR A PERSISTENT RESERVE TO THE RELEVANT LU, MP ADDS THE VALUE KEPT IN THE TABLE | THE COUNT THAT THE HOST GENERATES A RESERVE COMMAND TO THE RELEVANT LOGICAL UNIT | DETERMINE THAT ONE HAVING A LARGER KEPT VALUE IS THE PRIMARY SYSTEM |

| # | ITEM FIELD | CONDITION FIELD | DEFINITION FIELD | DETERMINATION LOGIC |
|---|---|---|---|---|
| 910 | 920 | 930 | 940 | 950 |
| 6 | FIRST OPERATING TIME OF A STORAGE DEVICE | WHEN THE STORAGE DEVICE IS TURNED ON AND BOOTED FIRST TIME, MP STORES THAT TIME IN THE TABLE | THE TIME AT WHICH A STORAGE DEVICE IS BOOTED FIRST TIME | DETERMINE THAT ONE HAVING AN OLDER KEPT VALUE IS THE PRIMARY SYSTEM |
| 7 | CONNECTING LU PATH NUMBER | MP RECORDS THE NUMBER OF PATHS EXTENDED TO THE RELEVANT LU IN THE TABLE AS TRIGGERED BY A STORAGE DEVICE CONFIGURATION CHANGE, OR MP CONFIRMS THE NUMBER OF PATHS AS TRIGGERED WHEN A PAIR IS CREATED, OR WHEN THE SVP MANIPULATES THE GUI, MP RECORDS THE NUMBER IN THE TABLE | THE NUMBER OF PATHS EXTENDED TO THE RELEVANT LU | DETERMINE THAT ONE HAVING A LARGER NUMBER OF PATHS IS THE PRIMARY SYSTEM |
| 8 | CONNECTING LU PATH FINAL CREATION TIME | MP RECORDS THE TIME IN THE TABLE AS TRIGGERED BY THE CASE IN WHICH THE PATH EXTENDED TO THE RELEVANT LOGICAL UNIT IS ADDED OR DELETED | THE TIME AT WHICH THE LAST PATH EXTENDED TO THE RELEVANT LOGICAL UNIT IS ADDED OR DELETED | DETERMINES THAT ONE HAVING A PATH CURRENTLY CHANGED IS THE SECONDARY SYSTEM |
| 9 | NUMBERS OF PRIMARY VOLUMES AND SECONDARY VOLUMES OF A COPY PAIR | WHEN AN INSTRUCTION IS MADE TO CREATE A PAIR, MP RECORDS THE NUMBERS OF P-VOL AND S-VOL IN THE TABLE | THE NUMBER OF PRIMARY VOLUMES AND THE NUMBER OF SECONDARY VOLUMES OF THE TC PAIR IN A CERTAIN STORAGE DEVICE | DETERMINE THAT ONE HAVING A LARGER NUMBER OF P-VOL IS THE PRIMARY SYSTEM |
| 10 | NUMBER OF UNUSED SECTORS IN LU | WHEN AN INSTRUCTION IS MADE TO CREATE A PAIR, OR DURING IDLE TIME, MP SCANS THE CONTENTS OF A LU AND RECORDS THEM IN THE TABLE, OR KEEPS THE BIT MAP RELATED TO THE SECTOR WRITTEN IN THE UNITS OF THE LUS | THE NUMBER COUNTING SECTORS BURIED WITH "00" OR "0xDEADBEAF" SECTORS IN THE RELEVANT LU | DETERMINES THAT ONE HAVING A LARGER KEPT VALUE IS THE SECONDARY SYSTEM |

```
C:¥>paircreate c vl f async-g PIYOGRP
Storage guesses that copy command would be mistake. Because ...
Copy Target LU** would be main volume, because much more write accesses were detected than the Primary Volume LU **.

CONTINUE CREATING REMOTE COPY PAIRS ? (yes/[no])
```
— INQUIRY IN S105

STORAGE SYSTEM, DATA PROTECTION METHOD AND MANAGEMENT COMPUTER, INCLUDING ARRANGEMENT FOR DATA REPLICATION BETWEEN STORAGE DEVICES

CROSS REFERENCES TO RELATED APPLICATIONS

This application relates to and claims priority from Japanese Patent Application No. 2008-209183, filed on Aug. 15, 2008, the entire disclosure of which is incorporated herein by reference.

BACKGROUND OF THE INVENTION

1. Field of the Invention

The present invention relates to a storage system and a data protection method of the same, for example, a storage system which protects data by preventing data replication from a secondary volume to a primary volume in a copy pair and a data protection method of the same.

2. Description of the Related Art

In a storage system before, in conducting remote copy, the volume of a storage device to be a replication source and the volume of a storage device to be a destination are specified to create a copy pair, and data replication is conducted from the volume of the replication source to the volume of the destination.

In addition, as a technique of controlling access in a storage system, such a technique is known that when an access request is received from a client, in the case in which it is determined whether the client issues an update request and it is determined that the client issues an update request, a master that is a mirror source is selected, whereas in the case in which it is determined that the client does not issue any update request, a mirror is selected, and then control is conducted in such a way that access requested is executed as the selected master or mirror is a target (for example, see Patent Reference 1 (JP-A-2007-219693)).

SUMMARY OF THE INVENTION

In the storage system, when an administrator makes an instruction to create a copy pair, no function is provided to identify whether the volume of the replication source is a primary system. On this account, in the case in which the administrator wrongly makes an instruction to configure a copy pair in which data replication is conducted from the secondary volume to the primary volume, that configuration cannot be automatically shut down, and data is replicated from the secondary volume to the primary volume. Thus, data stored in the primary volume is turned to be the contents of data stored in the secondary volume to sometimes lose the data.

In addition, such a problem also arises in the case of a copy pair configured in the same storage device.

The invention has been made in consideration of the points above, and an object is to provide a storage system which can prevent the configuration of a copy pair in which data replication is conducted from a secondary system to a primary system and can protect data, and a data protection method of the same.

The invention is a storage system including: a first storage device including at least one or more of first logical units; a second storage device including at least one or more of second logical units; and a management computer that conducts configuration related to a copy pair in which data is replicated from a first volume in the first logical unit configured to be a primary system to a second volume in the second logical unit configured to be a secondary system, wherein the first storage device has a first management unit that manages first information including a first measurement result related to a command received from a first host, the second storage device has a second management unit that manages second information including a second measurement result related to a command received from a second host, and the storage system has: a determining unit that determines whether data replication from the first volume to the second volume or data replication from the second volume to the first volume is replication from a primary system to a secondary system based on first information managed in the first management unit and second information managed in the second management unit when the management computer makes an instruction to configure data replication from the first volume to the second volume, and a display unit that displays a determined result of the determining unit on the management computer.

According to the invention, such a storage system which can prevent the configuration of a copy pair in which data replication is conducted from a secondary system to a primary system and can protect data, and a data protection method of the same can be proposed.

BRIEF DESCRIPTION OF THE DRAWINGS

The teachings of the invention can be readily understood by considering the following detailed Description in conjunction with the accompanying drawings, in which:

FIG. 2 shows a diagram depicting a measurement result table according to the embodiment;

FIG. 3 shows a diagram depicting a logical unit management table according to the embodiment;

FIG. 4A shows a diagram partially depicting a primary or secondary system determination table according to the embodiment;

FIG. 4B shows a diagram partially depicting another primary or secondary system determination table according to the embodiment;

FIG. 6 shows a diagram depicting an exemplary CUI according to the embodiment;

DETAILED DESCRIPTION OF THE INVENTION

Hereinafter, an embodiment according to the invention will be described with reference to the drawings.

Figure 1:
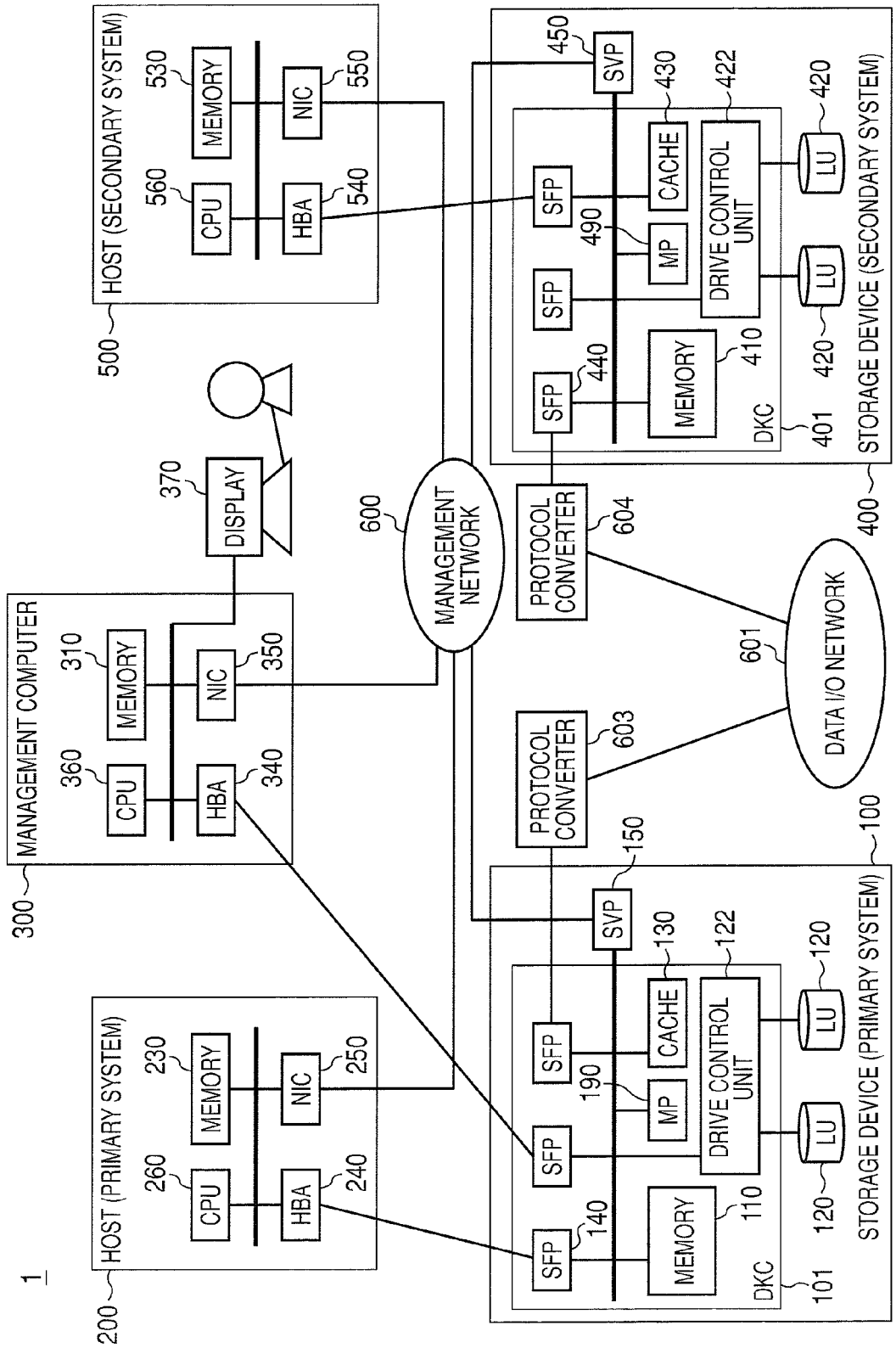
FIG. 1 shows a diagram depicting the overall configuration of a storage system according to an embodiment of the invention.

FIG. 1 shows a diagram depicting the overall configuration of a storage system. The storage system 1 includes a storage device (primary system) 100, a host (primary system) 200, a management computer 300, a storage device (secondary system) 400 and a host (secondary system) 500. The storage devices 100 and 400, the hosts 200 and 500 and the management computer 300 are connected to each other through a management network 600. In addition, the storage devices 100 and 400 are connected to protocol converters 603 and 604, respectively, through a data I/O network 601.

In the storage system 1, in creating a copy pair, the storage device 100 is a primary volume, and the storage device 400 is a secondary volume. In addition, the host 200 is a host for the storage device 100 in the primary system, and the host 500 is a host for the storage device 400 in the secondary system.

The storage device 100 is an apparatus that stores data therein. The storage device 100 includes a disk controller (DKC) 101, logical units (LU) 120, and a maintenance terminal (SVP) 150. The disk controller 101 is a controller having units to control the overall storage device 100 mounted thereon. The logical unit 120 is a data storage area provided by a hard disk drive, for example. The maintenance terminal 150 is a terminal exclusive for use in maintenance operations of the storage device 100.

The disk controller 101 includes a microprocessor (MP) 190, a memory 110, a cache 130, a drive control unit 122, and a plurality of SFPs (Small Form-Factor Pluggable) 140. The microprocessor 190 controls the storage device 100. The memory 110 is a memory used for a large scale storage device, and is not used for cache. For example, when a certain disk is paired with a disk in which the replication volume of that disk is created, difference information of each disk is stored in the memory 110. The cache 130 is a memory used to temporarily store data in order to write data from the disk controller 101 to the logical unit 120, or to read data stored in the logical unit 120. The drive control unit 122 controls the logical units 120.

The SFP 140 is an electronic device that converts optical inputs and outputs according to the fibre channel protocol such as SAN (Storage Attached Network) to electrical signals. One of the SFPs 140 is connected to a host bus adaptor 240, another one is connected to a host bus adaptor 340, and the other one is connected to the protocol converter 603.

In addition, the storage device 400 includes a microprocessor (MP) 490, a memory 410, a cache 430, a drive control unit 422, a disk controller (DKC) 401 having a plurality of SFPs 440, logical units 420 and a maintenance terminal 450. Since the configuration of the storage device 400 is the same as the configuration of the storage device 100, the detailed descriptions are omitted.

The host 200 has a CPU 260, a memory 230, the HBA (host bus adaptor) 240, and a NIC (Network Interface Circuit) 250. The CPU (Central Processing Unit) 260 controls the host 200. The memory 230 stores application programs and data therein. The host bus adaptor 240 controls communications with the storage device 100. The NIC 250 controls data communications through the management network 600.

The host 500 has a CPU 560, a memory 530, a host bus adaptor 540, and an NIC 550. Since the configuration of the host 500 is the same as the configuration of the host 200, the detailed descriptions are omitted.

The management computer 300 has a CPU 360, a memory 310, the host bus adaptor 340, an NIC 350, and a display 370. The CPU 360 controls the management computer 300. The memory 310 stores application programs and data therein. The host bus adaptor 340 controls communications with the storage device 100. The NIC 350 controls data communications through the management network 600. The display 370 displays information necessary for an administrator thereon. In addition, the administrator manipulates an input unit such as a mouse and a keyboard, not shown, to make inputs on the management computer 300 while seeing indications on the display 370.

In the storage system 1, when the MP 190 in the storage device 100 receives various commands such as read, write, and reserve from the host 200 in the primary system, the MP 190 stores the contents and the counts of the commands in a measurement result table of the memory 110 (the details will be described later). In addition, storing the contents and the counts of the commands is similarly processed in the MP 490 of the storage device 400 in the secondary system as well, and the contents and the counts of the commands are stored in a measurement result table of the memory 410.

FIG. 2 shows a diagram depicting a measurement result table 700 for each logical unit. The measurement result table 700 has a number field 710, a measured item field 720, and a measured value field 730.

The number field 710 is a field that stores numbers. The measured item field 720 is a field that stores measured items. Ten items of the following measured items are stored as corresponding to number 1 to number 10: the total count of reads/writes, the total capacity of reads/writes, the latest n counts of reads/writes, the latest n writes of the maximum write MB/s, the total count of reserves, the first operating time of a storage device, the connecting logical unit path number, the connecting logical unit path final creation time, the numbers of the primary volumes (sometimes also referred to as P-VOL)/the secondary volumes (sometimes also referred to as S-VOL) of other true copy pairs, and the number of unused sectors in the logical unit.

The measured value field 730 is a field that stores the measurement result of items configured of the measured items. For each of the measured items configured from number 1 to number 10, the results are stored as follows: 8,000,000,000 times, 3,023,344,422 sectors, 5,000 times, 40 MB/s, 20,000,000 times, 12317283, 4 paths, 2008 Feb. 14, 18:31:12, 10 P-VOLs, and 20,000 sectors.

In addition, in the embodiment, ten items shown in the measurement result table 700 are measured. However, the measurement objects are not limited to these ten items, and items may be any items as long as the items can be used for a determination process for the primary system and the secondary system, described later. In addition, the number of items to be measured is not limited to ten.

Next, the logical unit management table managed in the storage devices 100 and 400 will be described. FIG. 3 shows a diagram depicting a logical unit management table 800.

As shown in FIG. 3, the logical unit management table 800 has a storage device identifier field 810, a logical unit number field 820, a primary/secondary field 830, a storage device identifier field 840 including a pair LU, a pair logical unit number field 850, and a primary/secondary field 860.

The storage device identifier field 810 is a field that stores an identifier to identify a storage device. The logical unit number field 820 stores a logical unit number. The primary/secondary field 830 stores information indicating whether to be the primary volume or the secondary volume. The storage device identifier field 840 including the pair LU stores an identifier to identify a storage device including a pair LU. The pair logical unit number field 850 stores the logical unit number of the logical unit to be a pair. The primary/secondary field 860 stores information indicating whether the logical unit to be a pair is the primary volume or the secondary volume.

As shown in FIG. 3, the volume having the storage device identifier "S01" and the logical unit number "001" is paired with the volume having the storage device identifier "S11" and the logical unit number "001" as the secondary volume. It is configured that the volume having the storage device identifier "S01" and the logical unit number "001" is the primary volume, and the volume having the storage device identifier "S11" and the logical unit number "001" is the secondary volume.

Therefore, the volume having the storage device identifier "S01" and the logical unit number "001" is a logical unit provided in the logical unit 120 of the storage device 100 in the primary system, and the volume having the storage device identifier "S11" and the logical unit number "001" is a logical unit provided in the logical unit 420 of the storage device 400 in the secondary system.

FIGS. 4A and 4B show diagrams depicting a primary or secondary system determination table 900 (900A, 900B). The primary or secondary system determination table 900 is a table that configures information related to the items to determine whether to be the primary system or the secondary system.

The primary or secondary system determination table 900 has a number field 910, an item field 920, a condition field 930, a definition field 940, and a logic field 950. The number field 910 is a field that stores numbers. The item field 920 is a field that stores what item to be. The condition field 930 stores conditions how acquisition, configuration, and read are conducted. The definition field 940 stores the definitions of items stored in the item field. The logic field 950 stores the determination logic how to define whether to be the primary system or the secondary system.

In the item field 920, from number 1 to number 10, the following items are stored: the total count of reads/writes, the total capacity of reads/writes, the latest n counts of reads/writes, the latest n writes of the maximum write MB/s, the total count of reserves, the first operating time of a storage device, the connecting LU path number, the connecting LU path final creation time, the numbers of primary volumes and secondary volumes in a copy pair, and the number of unused sectors in LU, respectively. In addition, in the first embodiment, ten items described above are stored in the item field 920. However, the items are not limited to these items, any other items may be configured as long as the items are the items to determine whether to be the primary system or the secondary system, and the number of items may not be restricted to ten.

Next, the individual items configured in the item field 920 will be described.

The total count of reads/writes is the count that the host generates a read or write command to the relevant logical unit. The measurement is conducted in such a way that when the host issues a read or write command, the microprocessor increments the value kept in the measurement result table. The determination logic determines that one having a larger kept value is the primary system in the logical units configuring a pair.

The total capacity of reads/writes is the total storage capacity of reads or writes issued to the relevant logical unit. The measurement is conducted in such a way that the microprocessor adds the count of reads or writes issued to the logical unit by the host to the value kept in the measurement result table. The determination logic determines that one having a larger kept value is the primary system in the logical units configuring a pair.

The latest n counts of reads/writes are the counts that the host generates a read or write command to the relevant logical unit during the latest n counts. The measurement is conducted in such a way that the microprocessor writes the counts of reads or writes issued to the logical unit by the host during the latest n counts to the measurement result table. The determination logic determines that one having a larger kept value is the primary system in the logical units configuring a pair.

The latest n writes of the maximum write MB/s are the maximum value of write throughput from the host to the logical unit during the latest n writes. The measurement is conducted in such a way that the maximum MB/s of writes issued to the relevant logical unit by the host during the latest n writes is kept in the measurement result table, and when the maximum value is updated, the microprocessor updates the value kept in the measurement result table. The determination logic determines that one having a larger kept value is the primary system in the logical units configuring a pair.

The total count of reserves is the count that the host generates a reserve command to the relevant logical unit. In addition, the reserve command is a lock command to exclusively use the logical unit (disk). The measurement is conducted in such a way that when the host issues a reserve command or a persistent reserve to the relevant logical unit, the microprocessor adds the value kept in the measurement result table. The determination logic determines that one having a larger kept value is the primary system in the logical units configuring a pair.

The first operating time of a storage device is the time at which a storage device is booted first time. The measurement is conducted in such a way that when the storage device is turned on and booted first time, the microprocessor stores that time in the measurement result table. The determination logic determines that one having an older kept value is the primary system in the logical units configuring a pair.

The connecting LU path number is the number of paths extended to the relevant logical unit. The measurement is conducted in such a way that the microprocessor records the number of paths extended to the relevant logical unit in the measurement result table as triggered by a storage device configuration change, or the microprocessor confirms and records the number of paths as triggered when a pair is created. Moreover, at the time when the SVP manipulates the GUI (Graphical User Interface), the microprocessor records the number in the measurement result table. The determination logic determines that one having a larger number of paths is the primary system in the logical units configuring a pair.

The connecting LU path final creation time is the time at which the last path extended to the relevant logical unit is added or deleted. The measurement is conducted in such a way that the microprocessor records the time in the measurement result table as triggered by the case in which the path extended to the relevant logical unit is added or deleted. The determination logic determines that one having a path currently changed is the secondary system in the logical units configuring a pair.

The numbers of primary volumes and secondary volumes of the copy pair are the number of primary volumes and the number of secondary volumes of the true copy pair in a certain storage device. The measurement is conducted in such a way that when an instruction is made to create a copy pair, the microprocessor records the number of primary volumes and the number of secondary volumes in the measurement result table. The determination logic determines that one having a larger number of P-VOLs is the primary system in the logical units configuring a pair.

The number of unused sectors in LU is the number counting sectors buried with "00" or "0xDEADBEAF" sectors in the relevant logical unit. The measurement is conducted in such a way that when an instruction is made to create a copy pair, or during idle time, the microprocessor scans the contents of the logical unit and records them in the measurement result table, or keeps the bit map related to the sector written in the units of the logical units. The determination logic determines that one having a larger kept value is the secondary system in the logical units configuring a pair.

The determination items as described above are used to determine whether the logical unit configuring a pair is the primary system or the secondary system.

Next, an exemplary determined result displayed on the display 370 will be described. This determined result is a determined result V101 displayed on the display 370 shown in FIG. 5.

Figure 5:
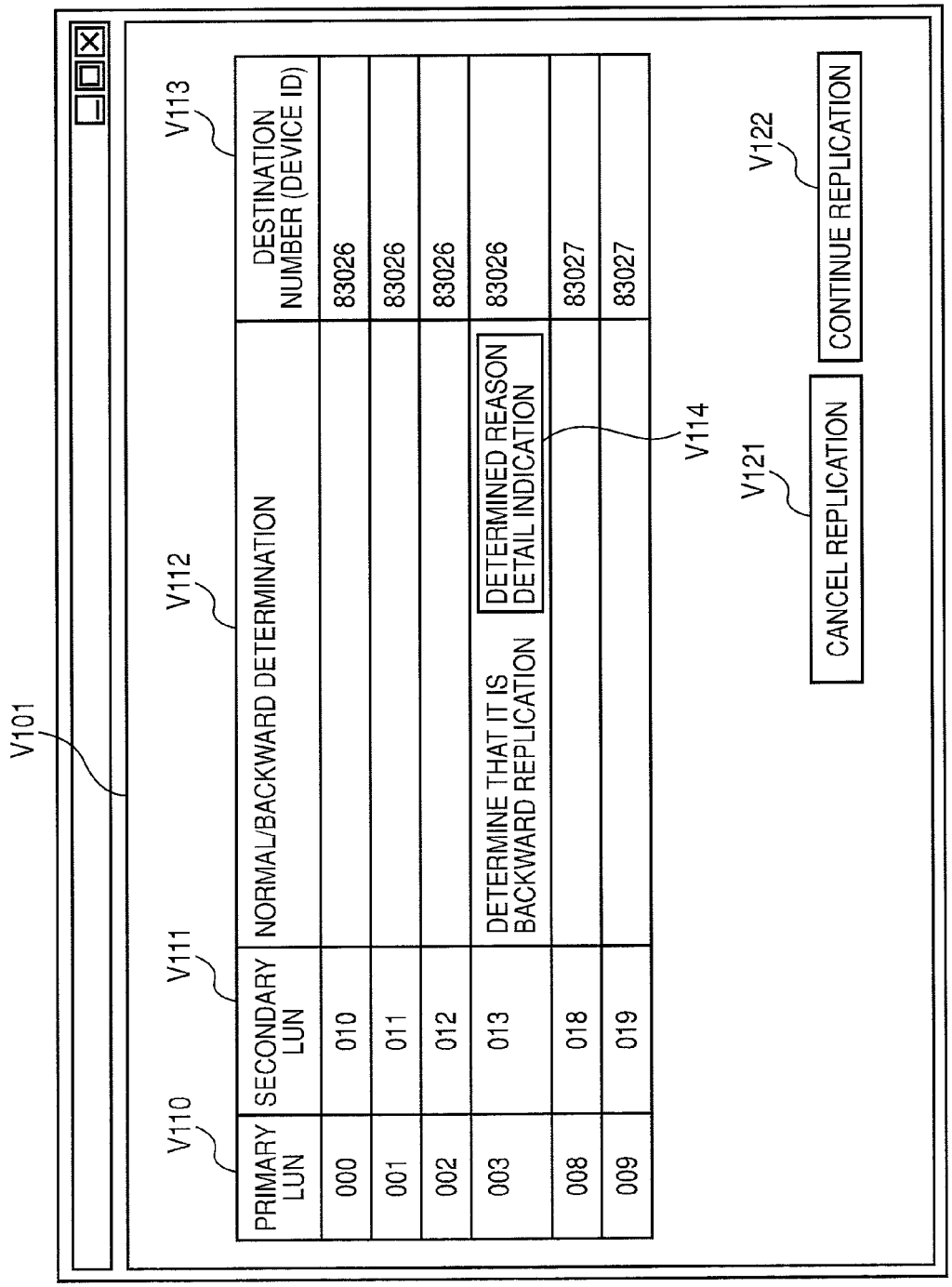
FIG. 5 shows a diagram depicting a determined result according to the embodiment.

As shown in FIG. 5, the determined result V101 has: a primary LUN field V110 that shows the logical unit number of the primary volume, a secondary LUN field V111 that shows the logical unit number of the secondary volume, a determination field V112 that shows information about normal/backward determined results, and a destination number field V113 that shows a destination storage device ID.

In the determination field V112, in the case of backward replication, the determination of backward replication is shown, and a determined reason detail indicating unit V114 is shown which detailedly shows the determined reason. When the administrator makes an input to the determined reason detail indicating unit V114, the detail of the determined reason is displayed on the display 370. Not shown in the drawing, for the determined reason, items determined that the primary system and the secondary system are reverse in the table for determination items are displayed, and the measurement results corresponding to these items are displayed.

In the determined result V101, a replication canceling unit V121, and a replication proceeding unit V122 are also displayed. The replication canceling unit V121 is a button that cancels replication from the volume specified as the primary system to the volume specified as the secondary system. The replication proceeding unit V122 is a button that cancels replication from the volume specified as the primary system to the volume specified as the secondary system.

Since the determined result V101 is provided with the replication canceling unit V121 and the replication proceeding unit V122, in the case in which the determined result that the primary system and the secondary system of the specified copy pair are reverse is displayed on the display 370, the administrator may confirm the detailed contents of the determined result by making an input to the determined reason detail indicating unit V114 to make an instruction to continue replication, or may cancel replication.

FIG. 6 shows a CUI (Character-based User Interface) V103 that instructs the contents displayed on the display 370, on which an instruction is described to display the contents of the determined result and the inquiry contents in Step S105, described later.

Figure 7:
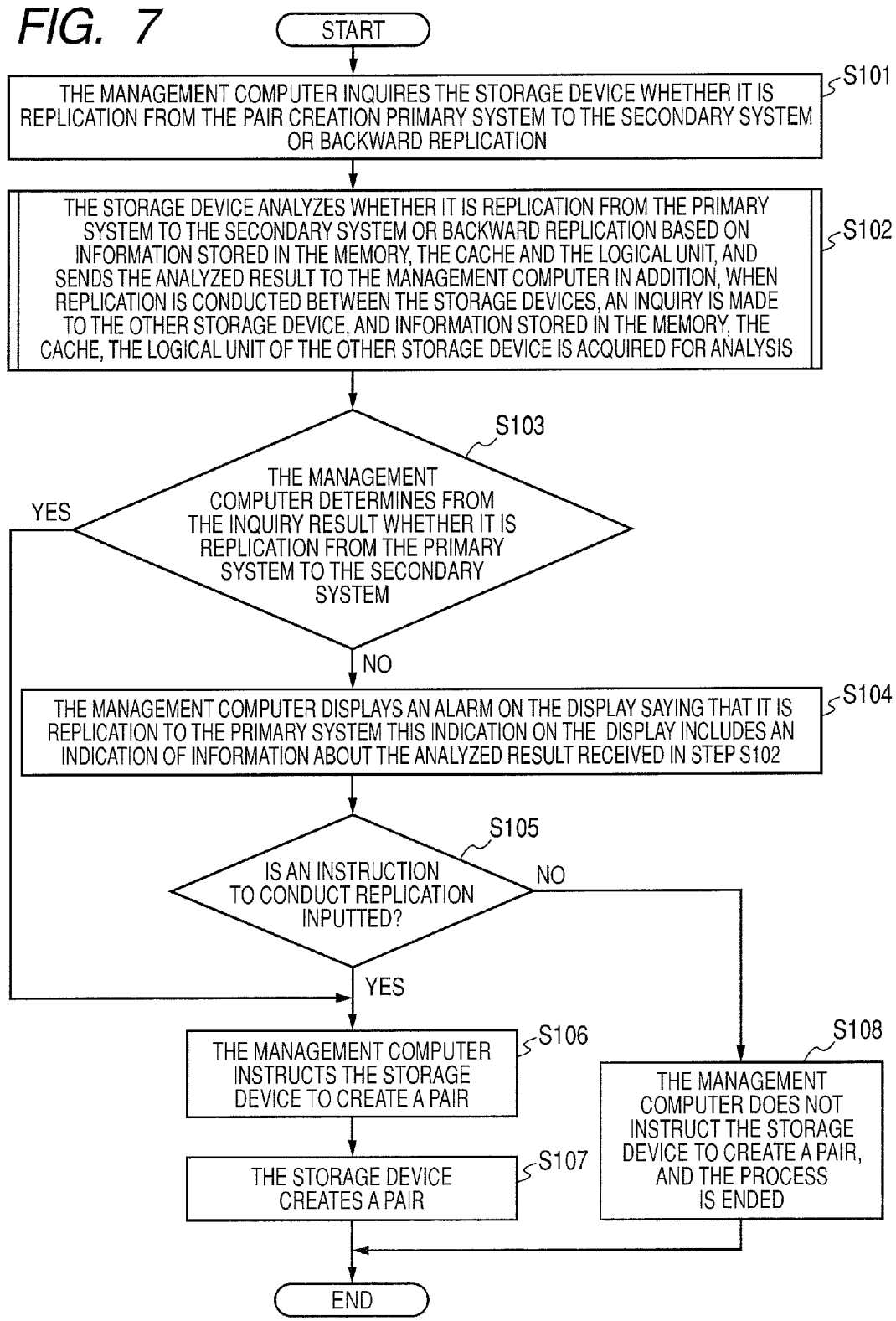
FIG. 7 shows a flow chart depicting a process when an instruction is made to create a copy pair according to the embodiment is instructed.
Figure 8A:
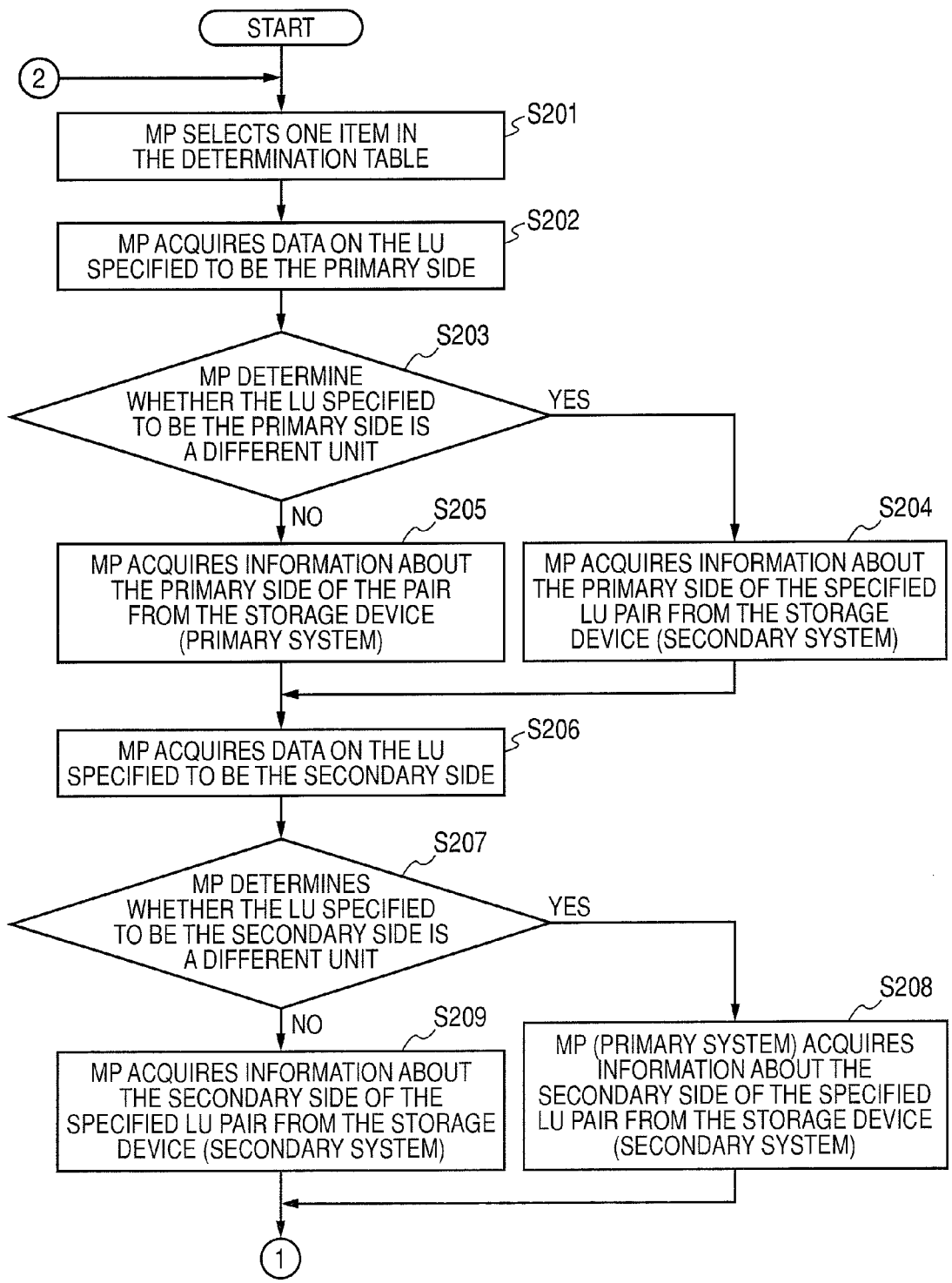
FIG. 8A shows a flow chart depicting contents of the process according to the embodiment.
Figure 8B:
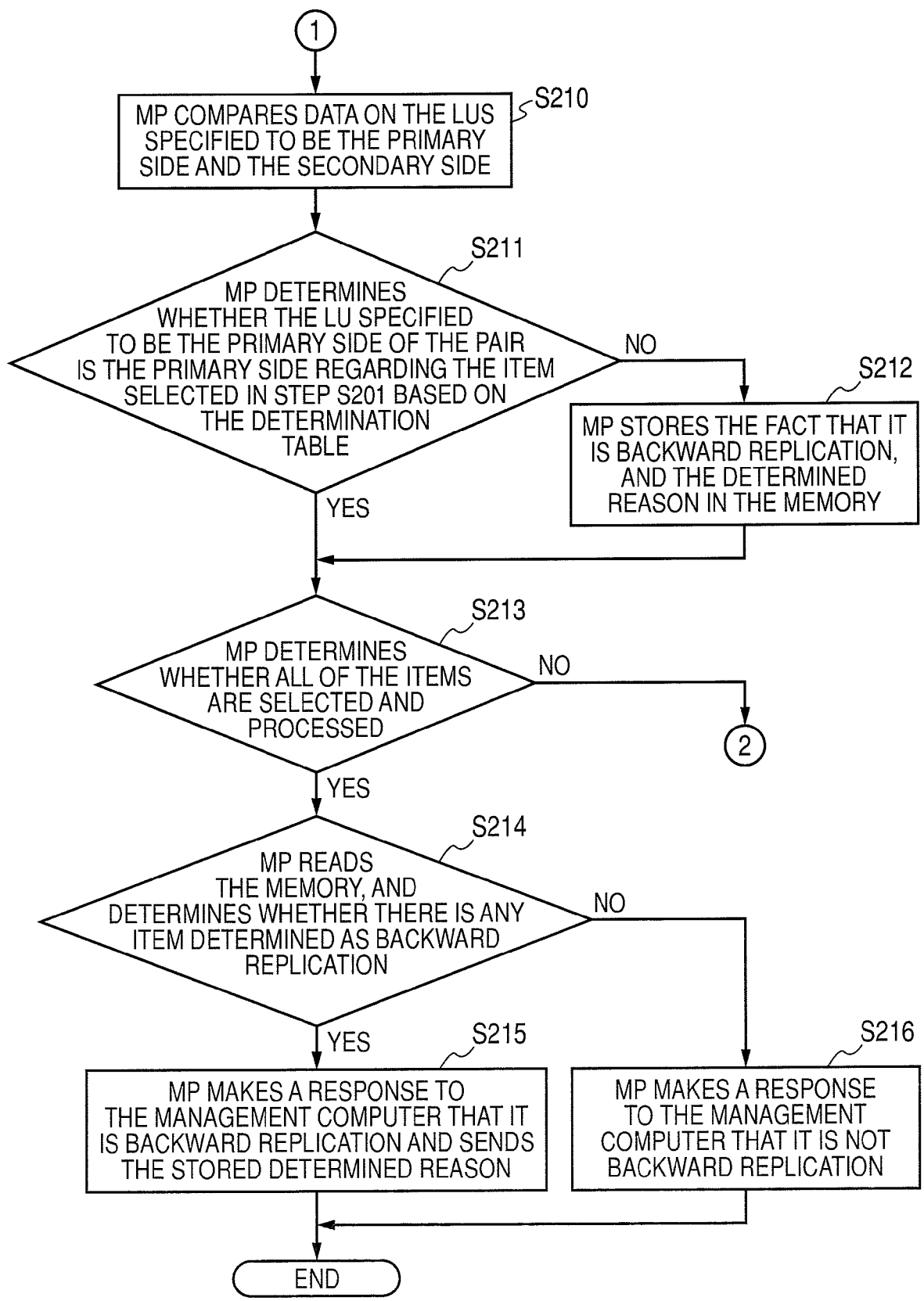
FIG. 8B shows a flow chart depicting contents of the process according to the embodiment.

Next, a process executed when a copy pair is created will be described. FIG. 7 shows a flow chart depicting a process when an instruction is made to create a copy pair, and FIGS. 8A and 8B show flow charts depicting the detailed contents of the process in Step S102 in FIG. 7.

First, in Step S101, the management computer 300 inquires the storage device 100 whether the creation of a copy pair instructed to the storage device 100 is data replication from the primary system to the secondary system or backward replication.

In Step S102, the storage device 100 analyzes whether data replication is replication from the primary system to the secondary system or backward replication based on information stored in the memory 110, the cache 130 and the logical unit 120, and sends the analyzed result to the management computer 300. In addition, in the case in which replication is conducted between the storage devices 100 and 400, an inquiry is made to the storage device 400, and information stored in the memory 410, the cache 430, the logical unit 420 of the storage device 400 is acquired for analysis. This analysis will be described later.

In Step S103, the management computer 300 determines from the inquiry result whether it is replication from the primary system to the secondary system. If the management computer 300 determines that it is replication from the primary system to the secondary system (S103: YES), the process goes to Step S106, whereas if the management computer 300 determines that it is not replication from the primary system to the secondary system (S103: NO), the process goes to Step S104.

In Step S104, the management computer 300 displays an alarm on the display 370 saying that it is replication from the secondary system to the primary system. This indication on the display 370 includes an indication of information about the analyzed result received in Step S102. In this process, the determined result indication described with reference to FIG. 5 is displayed on the display 370.

In Step S105, the management computer 300 determines whether an instruction to conduct replication is inputted. If the management computer 300 determines that an instruction is inputted, that is, if an input is made to the replication proceeding unit V122 (S105: YES), the process goes to Step S106, whereas if the management computer 300 determines that an instruction is no inputted, that is, if an input is made to the replication canceling unit V121 (S105: NO), the process goes to Step S108.

In Step S106, the management computer 300 instructs the storage device 100 to create a pair. In Step S107, the storage device 100 creates a pair, and the process is ended.

In Step S108, the management computer 300 does not instruct the storage device 100 to create a pair, and the process is ended.

Next, the detail of the process in Step S102 will be described with reference to FIGS. 8A and 8B.

First, in Step S201, the microprocessor 190 selects one item in the primary or secondary system determination table 900. In Step S202, the microprocessor 190 acquires data on the logical unit specified to be the primary side.

Subsequently, in Step S203, the microprocessor 190 determines whether the logical unit specified to be the primary side is a different unit. If the microprocessor 190 determines that the logical unit specified to be the primary side is a different unit (S203: YES), the process goes to Step S204, whereas if the microprocessor 190 determines that the logical unit specified to be the primary side is not a different unit (S203: NO), the process goes to Step S205.

In Step S204, the microprocessor 190 acquires information about the primary side of the specified logical unit pair from the storage device (secondary system). In Step S205, the microprocessor 190 acquires information about the primary side of the pair from the storage device (primary system).

Any one of the processes in Steps S204 and S205 is finished, and then in Step S206, the microprocessor 190 acquires data on the logical unit specified to be the secondary side.

Subsequently, in Step S207, the microprocessor 190 determines whether the logical unit specified to be the secondary side is a different unit. If the microprocessor 190 determines that the logical unit specified to be the secondary side is a different unit (S207: YES), the process goes to Step S208, whereas if the microprocessor 190 determines that the logical unit specified to be the secondary side is not a different unit (S207: NO), the process goes to Step S209.

In Step S208, the microprocessor 190 (primary system) acquires information about the secondary side of the specified logical unit pair from the storage device (secondary system).

In Step S209, the microprocessor 190 acquires information about the secondary side of the specified logical unit pair from the storage device (secondary system).

Any one of the processes in Steps S208 and S209 is finished, and then in Step S210, the microprocessor 190 compares data on the logical unit specified to be the primary side with data on the logical unit specified to be the secondary side.

Subsequently, in Step S211, the microprocessor 190 determines whether the logical unit specified to be the primary side of the pair is the primary side regarding the item selected in Step S201 based on the determination logic 950 of the primary or secondary system determination table 900. If the microprocessor 190 determines that it is the primary side (S211: YES), the process goes to Step S213, whereas if the microprocessor 190 determines that it is not the primary side (S211: NO), the process in Step S212 is finished, and then the process goes to Step S213.

In Step S212, the microprocessor 190 stores the fact that it is backward replication, and the determined reason in the memory 110.

In Step S213, the microprocessor 190 determines whether all of the items have been selected and processed. If all of the items have not been processed yet (S213: NO), the process returns to Step S201, and the processes above are repeated. If all of the items have been processed (S213: YES), the process goes to Step S214.

In Step S214, the microprocessor 190 reads the memory 110, and determines whether there is any item determined as backward replication. If there is any item determined as backward replication (S214: YES), the process goes to Step S215, whereas if there is no item determined as backward replication (S214: NO), the process goes to Step S216.

In Step S215, the microprocessor 190 makes a response to the management computer 300 that it is backward replication, and sends the stored determined reason. In Step S216, the microprocessor 190 makes a response to the management computer 300 that it is not backward replication. Any one of the processes in Steps S215 and S216 is finished, and the process in Step S102 is ended.

In accordance with the storage system 1 according to the embodiment, the storage device 100 manages the measurement result related to the command from the host 200 in the measurement result table 700 for each of the logical units 120, and the storage device 400 manages the measurement result related to the command from the host 500 in the measurement result table 700 for each of the logical units 420.

Then, when the management computer 300 makes an instruction to configure a copy pair, the microprocessor (for example, the microprocessor 190) determines whether it is the configuration of a copy pair from the primary system to the secondary system, based on information measured in the measurement result table 700 of the logical unit instructed to be the primary system (for example, the logical unit 120) and information measured in the measurement result table 700 of the logical unit instructed to be the secondary system (for example, the logical unit 420) with the use of each of the items configured in the primary or secondary system determination table 900. When it is determined that the logical unit specified to be the primary system is the secondary system in any one of all of the items configured in the primary or secondary system determination table 900, the determined result V101 is displayed on the display 370 as shown FIG. 5 saying the it might be backward replication.

Then, the administrator confirms the indication of the determined result V101, and makes an input to the determined reason detail indicating unit V114, as necessary, to confirm the determined reason. In the case in which data protection is not required even though the determined configuration is replication from the secondary system to the primary system, the administrator can make an input to the replication proceeding unit V122 to instruct continuing the configuration of the copy pair for data replication. In the case in which data protection is required, the administrator can make an input to the replication canceling unit V121 to instruct canceling the continuation of the configuration of the copy pair.

Therefore, according to the storage system 1, the configuration of a copy pair can be prevented in which data replication is conducted from a secondary system to a primary system, and data can be protected.

In addition, in the embodiment, the case is described that the determined result V101 is displayed on the display 370 in the case in which there is any item determined that it is backward replication when an instruction is made to create a copy pair. However, the invention is not limited thereto. For example, the determined result V101 may be displayed on the display 370 regardless whether to be backward replication, or the determined result V101 may be displayed on the display 370 in the case in which a predetermined number of items or greater is determined as backward replication. Moreover, a condition to display the determined result V101 on the display 370 may be freely configured from these conditions.

Moreover, in the embodiment, the case is mainly described that a copy pair is created between the storage device 100 and the storage device 400. However, the invention is also applicable to the case in which an instruction is made to configure a copy pair in the storage device 100 (or 400).

The invention can be widely adapted to a storage system in which a copy pair is created and to a data protection method of the same.

What is claimed is:

1. A storage system comprising:
a first storage device including at least one or more first logical units;
a second storage device including at least one or more second logical units; and
a management computer that conducts configuration related to a copy pair in which data is replicated from a first volume in the at least one or more first logical units configured to be a primary system to a second volume in the at least one or more second logical units configured to be a secondary system,
wherein the first storage device has a first management unit that manages first information including a first number of total read/write commands from a first host to the first volume,
the second storage device has a second management unit that manages second information including a second number of total read/write commands from a second host to the second volume, and
the storage system further comprising:
a determining unit that determines whether data replication from the first volume to the second volume or data replication from the second volume to the first volume is replication from the primary system to the secondary system based on a comparison between the first number and the second number, when the management computer makes an instruction to configure data replication from the first volume to the second volume,
a display unit that displays a determined result of the determining unit on the management computer if the first number is less than the second number, and a data replication unit that replicates the data from the first volume to the second volume if the first number is greater than the second number.

2. The storage system according to claim 1,
wherein the first information managed in the first management unit and the second information managed in the second management unit include information about a same item content, and are managed in units of each of the at least one or more first logical units and the at least one or more second logical units, and the first information managed in the first management unit and the second information managed in the second management unit are related to third information effective to analyze which logical unit is the primary system or the secondary system, when the at least one or more first logical units including the first volume instructed to configure the copy pair is compared with the at least one or more of second logical units including the second volume.

3. The storage system according to claim 2, wherein the third information includes at least any one of items of information indicating: a capacity of total read/write commands, a latest count of read/write commands, a maximum capacity of a latest count of write commands, a total count of reserves, a first operating time, a connection path number of the at least one or more first or the at least one or more second logical units, a final creation time of a connection path, a number of primary volumes and a number of secondary volumes in the at least one or more first logical units and the at least one or more second logical units, and a number of unused sectors in the at least one or more first logical units and the at least one or more second logical units.

4. The storage system according to claim 1, wherein an indication on the display unit includes an indication of an instructing unit that continues a process of configuring the copy pair.

5. A data protection method of a storage system, wherein the storage system includes:
a first storage device including at least one or more first logical units;
a second storage device including at least one or more second logical units; and
a management computer that conducts configuration related to a copy pair in which data is replicated from a first volume in the at least one or more of the first logical units configured to be a primary system to a second volume in the at least one or more of the second logical units configured to be a secondary system,
wherein the first storage device has a first management unit that manages first information including a first number of total read/write commands from a first host to the first volume,
the second storage device has a second management unit that manages second information including a second number of total read/write commands from a second host to the second volume, and
the method includes:
determining whether data replication from the first volume to the second volume or data replication from the second volume to the first volume is replication from the primary system to the secondary system is based on a comparison between the first number and the second number, when the management computer makes an instruction to configure data replication from the first volume to the second volume;
displaying a determined result on the management computer if the first number is less than the second number; and
replicating the data from the first volume to the second volume if the first number is greater than the second number.

* * * * *